July 4, 1933.  A. L. BAUSMAN  1,916,959
ARTICLE ALIGNING MECHANISM
Filed April 17, 1930
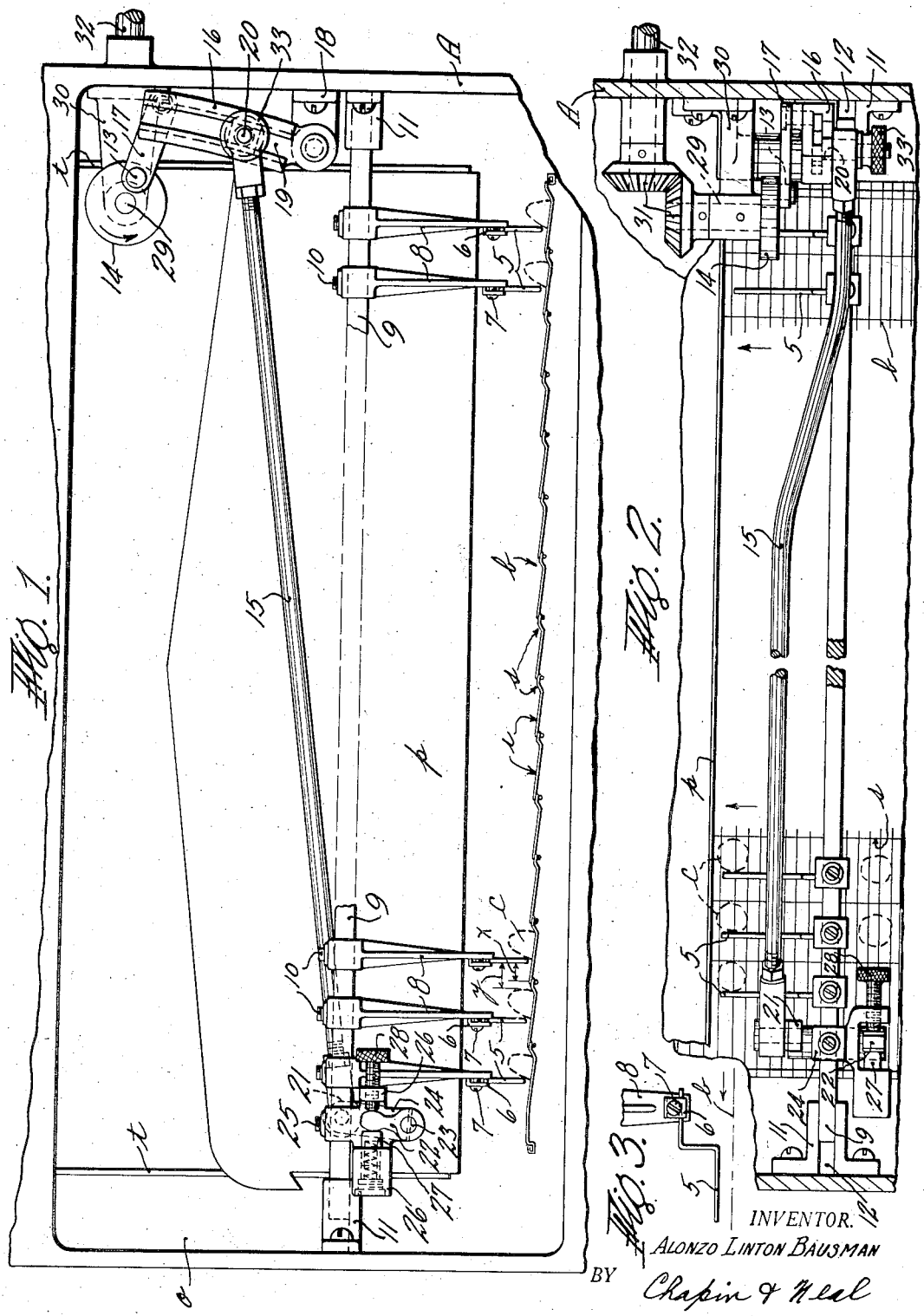
INVENTOR.
ALONZO LINTON BAUSMAN
BY Chapin & Neal
ATTORNEYS.

Patented July 4, 1933

1,916,959

UNITED STATES PATENT OFFICE

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS

ARTICLE ALIGNING MECHANISM

Application filed April 17, 1930. Serial No. 445,164.

This invention relates to improvements in mechanism for aligning articles on conveyers to secure their arrangement in longitudinal rows.

The invention finds one advantageous use in connection with confection coating machines. It is common practice to use in connection with such machines some type of decorator which, either by the application of strings of coating material or by the use of tools to contact with and work the coating, forms decorative markings on the coated confections. It is essential, in such cases, that the confections be accurately located on the belt of the coating machine so as to receive the decorative strings or so as to be engaged by the decorating tools, as the case may be. The present invention provides an improved means for lining up the confections in longitudinal rows on the coating machine belt preparatory to the decorating operation.

The invention has for an object to provide an aligning mechanism which will positively move the confections with certainty into the desired positions of alignment.

The invention also has for an object to provide an aligning mechanism operative on the confections before they are coated.

These and other objects will more particularly appear as the detailed description proceeds and will be pointed out in the appended claims.

The invention will be disclosed with reference to the accompanying drawing in which:—

Fig. 1 is an end elevational view showing a portion of the feed end of a confection coating machine,—enough to illustrate the application of my invention thereto;

Fig. 2 is a fragmentary plan view of the mechanism shown in Fig. 1; and

Fig. 3 is a detail view of one of the fingers used to move the confections into position on the belt of the confection coating machine.

Referring to Fig. 1, A represents the casing of a confection coating machine and $o$ the window opening in one end thereof, through the lower part of which the confections to be coated are carried into the machine and delivered to the wire mesh coating belt $b$. The usual shower pan for delivering a downward flow of chocolate, or other coating material, upon the confections carried by belt $b$, is shown conventionally at $p$ and its supports at $t$. The shower pan, while adjacent opening $o$, is spaced far enough therefrom to leave room for the aligning mechanism of this invention, as will be clear from Fig. 2. As viewed in Fig. 2, the belt and confections $c$ travel upwardly and the confections are subjected to the action of the aligning mechanism before they reach the downwardly flowing stream of coating material which is delivered in a sheet across belt $b$ by the shower pan $p$.

The coating machine, thus briefly referred to, may be assumed to be of the type shown in Carlson Patent No. 790,184, dated May 16, 1905, or of the type shown in Bausman Patent No. 1,323,948, dated December 2, 1919, or of any other suitable type. A window, indicated in the Carlson patent, usually closes off opening $o$ except for a small space sufficient to allow the confections to enter the casing A.

The belt $b$ is preferably of the general type disclosed in Patent No. 1,011,444, granted December 12, 1911, on an invention of Theodor and David Kihlgren. The belt is of wire mesh and each cross wire thereof, as shown in Fig. 1, is formed with a transverse series of inclined portions $i$ and a series of shoulder portions $s$, each of the latter connecting the lowest point of one portion $i$ to the highest point of the next succeeding portion $i$. Thus, the belt is in effect, channeled or divided into "lanes" and the shoulders form one longitudinal wall of the channels. The important feature is to have on belt $b$ some stop-forming means against which the confections may be moved and brought into the desired positions of alignment. The shoulders $s$ will serve as an example of one such means, suitable for the present purpose, but it is not intended to restrict the invention to this particular type of stop forming means, as many other suitable types will readily occur to those skilled in the art.

The aligning mechanism, as shown herein, comprises a plurality of fingers 5, one for each shoulder s of belt b. These fingers are arranged in laterally spaced relation in a transverse series across belt b. Each finger is given a reciprocating motion in a horizontal direction crosswise of belt b and is movable in a plane close to but overlying the belt, so as to engage a confection c and move it against the adjacent shoulder s unless it happens to be already so located.

An important feature of this mechanism is that the confections are moved positively as distinguished from the plan proposed in the Kihlgren patent where, by vibration of belt b the confections were caused to slide down the inclines i and bring up against the shoulders s. Positive movement of the confections was not feasible under the plan of the Kihlgren patent because the confections were aligned after coating and the contact with the coated confections, necessary to secure positive movement, would mar the coatings. By aligning the confections before coating them, this objection is overcome. It may be pointed out also that much freer lateral movement of the confections on belt b may be had before coating than afterwards, as the viscous coating tends to make the confections cling to belt b.

As shown herein, each finger 5 is conveniently made up of wire, bent as shown in Fig. 3, and one end thereof is fastened by a clamp 6 and screw 7 to the lower end of an arm 8. It is usually desired to have the several fingers 5 reciprocate in unison and, when such is the case, the upper ends of the several arms are fastened to a common bar 9 as shown, preferably in adjustable fashion, as by set screws 10. The bar 9 extends transversely across and above belt b and is slidably supported near each end thereof in brackets 11 secured to casing A. The bar 9 is conveniently of square cross section or otherwise suitably formed to prevent turning in its brackets 11 and to prevent turning of arms 8 thereon. The brackets 11 preferably have grooves 12 in their upper faces in which the ends of bar 9 are slidably received. The arrangement permits the bar, with all the arms 8 and fingers 5 thereon, to be conveniently lifted out of its supporting bracket and removed, when desired.

According to the broader features of the invention, bar 9 may be reciprocated by any suitable mechanism. A preferred form of mechanism for the purpose is shown herein, based on the crank and connecting rod principle. A crank pin 13 on a revolving disc 14 operates through a connecting rod 15 to reciprocate bar 9. I prefer to supplement this simple mechanism by means enabling the stroke of bar 9 to be varied. One way of securing this result is to interpose between pin 13 and rod 15, a lever 16 and a link 17. The lever 16 is pivoted at its lower end to a bracket 18 secured to casing A and has a T-slot 19 to receive the square head of a stud 20,—the latter forming a pivotal connection between rod 15 and the lever. The link 17 connects the crank pin 13 to the upper end of lever 16. The slot 19 is preferably curved with a radius of curvature equal to the distance between the pivots of rod 15. By so doing, it is possible, when lever 16 occupies its extreme left hand position, to vary the stroke of bar 9 (by moving stud 20 up or down in slot 19) without altering the lateral position of bar 9. The position of lever 16, referred to is that in which the curve of slot 19 is concentric with the pivotal connection of rod 15 to bar 9.

The last named connection might be made directly to the bar but I find it advantageous to interpose a means by which the position of the fingers 5 relative to belt b may be varied. As above described, the extent of the stroke of these fingers may be varied and the adjustment, to which I now refer, enables the position of the stroke, whatever its extent, to be varied with reference to belt b. The particular means illustrated for effecting this result includes two levers 21 and 22, fixed on opposite ends of a short shaft 23, which is mounted in the lower part of a bracket 24, fixed at its upper end (preferably adjustably as by set screw 25) to bar 9. The free end of lever 21 is pivotally connected to rod 15. The free end of lever 22 lies between two laterally spaced ears 26 on bracket 24. In one of these ears is mounted a spring pressed plunger 27 which engages one side of lever 22. In the other ear, there is threaded a screw 28 which engages the opposite side of lever 22. By turning screw 28, bracket 24 and thus rod 9 and fingers 5, may be moved laterally without movement of the pivotal connection betwen rod 15 and lever 21.

The aligning mechanism, thus described, may be driven from any suitable source of power. As shown, the crank disc 14 is fixed to one end of a shaft 29, which is rotatably mounted in a bracket 30 secured to casing A, and the other end of this shaft is connected by bevel gears 31 to a shaft 32, which may be assumed to be one of the usual shafts of the coating machine. The drive is preferably such, with relation to the linear speed of belt b, that each confection will be engaged several times by a finger 5 as it travels alongside the latter.

It is to be noted that link 15 is held to stud 20 by a knurled nut 33, which forms a conveniently detachable connection in the linkage between the crankpin 13 and bar 9. By loosening nut 33, the right hand end of link 15 may be lifted or lowered until the stud rides out of slot 19, whereupon the bar 9 may be lifted free from its supports and removed with link 15 attached.

There are two ways in which the aligning mechanism may be operated,—namely in conjunction with a belt, such as $b$ having shoulders $s$ or their equivalent, or with a belt of ordinary form in which there are no such shoulders. The former operation is preferred as calculated to yield the best results, but the latter may in many cases suffice and is deemed to be within the scope of my invention.

According to the first plan of operation, each finger 5 will normally function to engage the confections in one lane only of belt $b$. The mechanism is first adjusted for the size of confection $c$ to be handled. With the fingers 5 at the right hand end of their stroke, the screw 28 is turned to move the fingers to the right or to the left, as may be necessary, until the distance between each finger and the shoulder $s$, with which it cooperates, is equal to the diameter or width of the confection. The stroke of the fingers is then adjusted so that each will cover in its reciprocation the rest of the width of the inclined portion $i$ without, however, engaging the confection $c$ in the next lane of belt $b$. With these adjustments made, the belt $b$ and the aligning mechanism are set in motion. Confections $c$, which are out of contact with a shoulder $s$, as shown in the lower part of Fig. 2, will be engaged by the fingers 5 and moved against such shoulders in a positive and certain manner.

The other plan of operation may be used with a plain type of belt having a smooth surface unbroken by shoulders, such as $s$. In this case, the initial adjustment, above described, would be made as before to locate the fingers so that each will, at the extreme right hand end of its stroke, have moved a confection laterally to the right into the desired position. The stroke of these fingers is, however, so adjusted that each will at the left hand end of its stroke, just touch a confection in the adjacent lane provided that confection is properly positioned. For example, with reference to Fig. 1, the fingers would have the stroke indicated by the dimension $y$ rather than the stroke used with the other plan of operation and indicated by the dimension $x$. Thus, as to any one unaligned confection $c$ on belt $b$, it will be shifted back and forth between two fingers 5 until it comes into the proper position of alignment. When a confection is moved to the right by one finger, it should be carried into the desired position but, without a locating shoulder, such as $s$, on the belt, the confection might be carried by its momentum beyond this position and, if so, it will be moved back by an adjacent finger near the end of the left hand stroke thereof.

It is to be noted that the aligning means of this invention does not involve any rapping of the coating belt. Any such rapping results in the removal from the confections of some of the applied coating and it may be disadvantageous to do so with certain types of decorations. It is also to be noted that the confections, in practice, generally have a preliminary bottom coating applied thereto before they enter the casing A. This bottom coating tends to become rather mushy when the confections enter the casing A and, as a consequence, interferes with free movement of the confections on the belt. Therefore, it is essential to positively move them on the belt rather than to rely on their sliding down the inclines $i$.

The invention has been disclosed herein, in an embodiment at present preferred, for illustrative purposes, but the scope of the invention is defined by the appended claims rather than by the foregoing description.

What I claim is:

1. In a confection coating machine and in combination with the conveyer on which the confections are carried in a plurality of longitudinally disposed rows while being coated, a plurality of fingers one for each such row mounted above said conveyer in laterally spaced relation and arranged in a transverse series across said conveyer, each such finger positioned in alignment with the direction of movement of said conveyer and all such fingers except for one end finger of the series disposed between the rows of confections, said fingers mounted for simultaneous and bodily shifting movement with a motion of pure translation in a direction transverse to the direction of movement of the conveyer, means for reciprocating said fingers, means for adjusting the stroke thereof, and means for simultaneously varying the position of all such fingers with respect to the conveyer, said stroke-adjusting and position-varying means being manipulated for confections of any given size so that each finger will at one end of its stroke just touch a confection in one of the two adjacent rows and at the other end of its stroke just touch a confection in the other adjacent row provided the confection in each case is accurately aligned in its row.

2. The combination with an article carrying belt having its article carrying face formed with longitudinal channels and shoulders defining one longitudinal edge thereof, of a plurality of fingers one for each channel of said belt mounted above the same in laterally spaced relation and arranged in a transverse series across said belt, each said finger positioned in alignment with the direction of conveyer movement and bodily movable in a direction transverse to the direction of travel of the belt and adapted to engage an article carried by the belt and positively move it transversely of the belt against one of said shoulders said bodily movement preserving the alignment of the fingers with the direction of conveyer movement, and means for reciprocating said fingers.

3. The combination with an article carrying belt having its article carrying face formed with longitudinal channels and shoulders defining one longitudinal edge thereof, of a plurality of fingers one for each channel of said belt mounted above the same in laterally spaced relation and arranged in a transverse series across said belt, each said finger positioned in alignment with the direction of conveyer movement and bodily movable in a direction transverse to the direction of travel of the belt and adapted to engage an article carried by the belt and positively move it transversely of the belt against one of said shoulders said bodily movement preserving the alignment of the fingers with the direction of conveyer movement, and means for reciprocating said fingers including means for varying the stroke thereof.

4. The combination with an article carrying belt having its article carrying face formed with longitudinal channels and shoulders defining one longitudinal edge thereof, of a plurality of fingers one for each channel of said belt mounted above the same in laterally spaced relation and arranged in a transverse series across said belt, each said finger positioned in alignment with the direction of conveyer movement and bodily movable in a direction transverse to the direction of travel of the belt and adapted to engage an article carried by the belt and positively move it transversely of the belt against one of said shoulders said bodily movement preserving the alignment of the fingers with the direction of conveyer movement, means for reciprocating said fingers, and adjusting means for simultaneously varying the lateral position of all said fingers with respect to said conveyer.

5. In combination with an article carrying belt, a member mounted above the same for reciprocation in a direction transverse to that of the travel of said belt, a series of fingers fixed to and depending from said member toward said belt into position to engage articles thereon, supports in which said member is slidably received and by which it is supported with freedom to be lifted free therefrom and removed when desired, and means for reciprocating said member.

6. In combination with an article carrying belt, a member mounted above the same for reciprocation in a direction transverse to that of the travel of said belt, a series of fingers fixed to and depending from said member toward said belt into position to engage articles thereon, supports in which said member is slidably received and by which it is supported with freedom to be lifted free therefrom and removed when desired, and means for reciprocating said member including a conveniently detachable connection enabling removal of said member.

In testimony whereof I have affixed my signature.

ALONZO LINTON BAUSMAN.